Aug. 12, 1969  J. C. GAGER  3,460,462

AUTOMATIC POULTRY COOKER

Filed March 21, 1968

INVENTOR
John C. Gager 3,460,462
AUTOMATIC POULTRY COOKER
John Chapman Gager, Montgomery County, Md. (5215
 Massachusetts Ave. NW., Washington, D.C. 20016)
Filed Mar. 21, 1968, Ser. No. 714,942
Int. Cl. A47j *37/12*
U.S. Cl. 99—404                    2 Claims

ABSTRACT OF THE DISCLOSURE

A device of the endless conveyor type for frying poultry or the like partially immersed in heated cooking oil.

---

This invention relates to a device for frying poultry, game, or the like, and more particularly, in its preferred embodiment, to a device which is capable of frying whole (cleaned and dressed) chicken extremely rapidly in a mass-production manner; so that the final cooked product resembles in every material way, the so called "home pan-fried" which has been a steady favorite in American culinary art.

The patent to Thomas Dix Barker and Ethel Cox Barker No. 3,336,859 issued Aug. 22, 1967, discusses in detail the problems encountered in the prior art, and discloses a device which seeks to meet these problems, and to produce a satisfactory end result in a particular way.

It is an object of the present invention to provide a simplified, compact, and automatic device which produces equally good results at a steady and sustained production rate, which is limited only by the size machine built, and does not depend upon any skill or dexterity on the part of the operator. It is a further object of t' invention to provide such a device which is of simple construction, has few parts and may be easily disassembled for periodic cleaning or servicing.

It is still a further object of the present invention to provide such a device which may easily be built in a variety of sizes which will meet different anticipated production requirements.

It is yet another object of the invention to provide a conveying system which may be lifted off of the cooking pan at will so that it may be used with alternate pans or the pan may at times be used for conventional deep fat frying.

The principal problem well known in the art is that generally when uncooked food items are placed in the hot cooking oil the heat absorbed thereby cannot be replaced rapidly enough to do the cooking job in the permissible time without using such high heat intensities that undesirable break-down of the oils occurs; on the other hand reduced cooking temperatures for an impermissible length of time result in a soggy, greasy, poorly cooked product. In the present invention regulation of adjacent heat zones the length of the pan results in maximum efficiency in heat transfer, and the sequential introduction of uncooked product into the heated oil requires at most only a limited and fairly steady heat recovery rate.

Another well known problem in the art is that any small particles that detach from the food product begin to cook at a rapid rate until they have carbonized leaving among other things an unsavory taste. It has been found in the present invention that most particle detachment occurs at the initial stage of cooking. It has also been found most advantageous to commence the cooking process at a somewhat reduced temperature. Accordingly, in its preferred embodiment the cooking pan may be provided with a shallow depression at the end where the product is introduced which will serve as a catch basin for the particles, and will be in a relatively "cool zone" since it is not necessary to supply heat at that particular area. The particles may be removed from time to time in an unburned condition.

In the preferred operation of the invention, whole, cleaned, chicken which have been processed in, for example, the manner disclosed in the patent granted to M. W. Garland, No. 2,979,914, dated Apr. 18, 1961; wherein dressed poultry enters an endless conveyor and moves through a counter current of progressively colder water while traveling the length of a flume at a rate of speed that requires several hours for the process, are suitably seasoned and floured and then placed in basketlike containers which are a part of this invention. The basket like containers are then placed upon a track which inclines downwardly to the loading station of the cooker. The force of gravity causes the basket-like containers to press towards the cooker's entrance where a yieldable detent arrangement prevents further onward travel. Mutually spaced tines mounted on a pair of link chain belts move in an endless path between suitably spaced sprockets so that the tines will engage stub shafts on each end of the basket-like containers, and at measured intervals determined by the distance between the mutually spaced pairs of tines, force the basket-like containers in succession, past the yieldable detent, along the cooker's track, and then out of the cooker. It will be seen that the basket-like containers rest upon the stub shafts and that these stub shafts, in the preferred embodiment, have squared ends; it will further be seen that the basket-like containers may rest upon the cylindrical portions of the stub shafts and that, with a proper coefficient of friction beween that part of the stub shaft and the track, the impingment of the tine against the cylindrical portion causes rotation as the basket-like container moves along the track. It is obvious that a stub shaft could be provided with any desired diameter, ranging from a diameter greater than that of the basket-like container itself, down to a very small diameter. The diameter selected and shown in the drawings for purposes of illustration, is relatively small, and would rotate the basket-like container more times than is needed for best cooking results, it is for this reason that the end portions of the stub shafts have been made square. To explain further; camming strips of measured length, and spaced at measured intervals may be placed along the track, and located so that they will engage only the squared portion of the stub shaft. When a stub shaft is moving over a camming strip only sliding will occur. It will be seen that if the distance between camming strips is half the circumference of the stub shaft, then a 180 degree rotation will take place between camming strips; it will be seen that with different distances between camming strips, the basket-like containers may be rotated different fractions of a circle, thus allowing a wide latitude in arranging the manner of immersion of the product as it passes through the cooker.

The aforementioned objectives, as well as others, of the invention will become more readily apparent on reading the following descriptive disclosure of an illustrative embodiment of the invention which is illustrated in the accompanying drawing in which.

Figure 2:
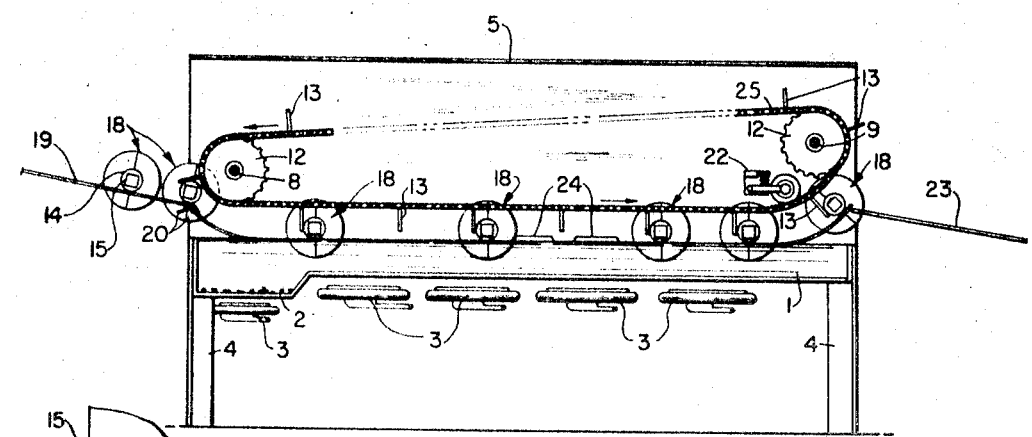
FIGURE 2 is a section of the cooker taken approximately along plane 2—2 of FIGURE 1.
Figure 4:
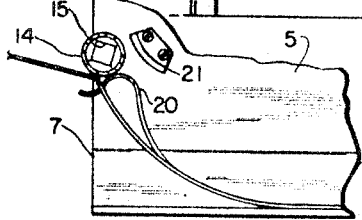
FIGURE 4 is an enlarged sectional view of the yieldable detent and stop arrangement.

Turning now to the drawing, and more particularly to FIGURE 2, an elongated shallow pan 1 preferably made of stainless steel and having a depression 2 to serve as a catch basin for waste particles at one end, is filled with any desired cooking oil, and is heated by a plurality of heating elements 3 which may be of conventional gas or electric design and having individual thermostatic sensing and control means which are not of particular novelty in themselves. The pan 1 and heating elements 3 and their associated control devices are mounted on a supporting framework 4 of any suitable design, but it is preferable to use stainless steel materials in its construction as well as in the construction of all other of the parts if at all possible.

The pan 1 is provided with a removable cover 5 which may have a plurality of access openings 6 which may be fitted with removable frame-holders containing any type of the well known metallic strand filter elements or the like, which will permit the escape of water vapor from the cooker but will assist in preventing the escape of cooking oil.

Figure 1:
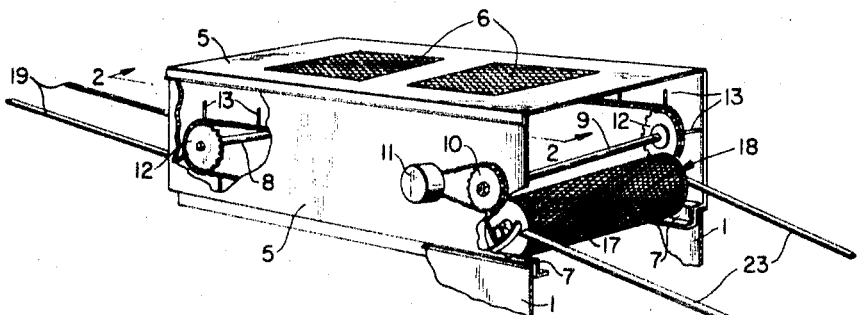
FIGURE 1 is a view of the device in perspective with portions cut away to show certain elements of the conveyor arrangement.
Figure 6:
FIGURE 6 is a section showing camming strips as they might be placed along the track, and the cooperative arrangement of track, camming strip, and stub shaft.
Figure 3:
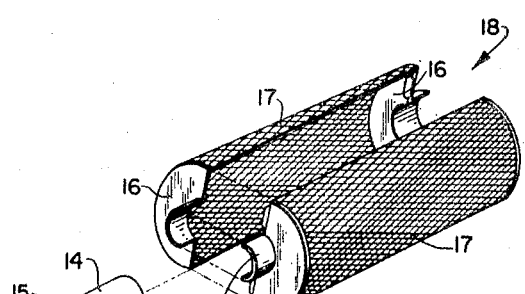
FIGURE 3 is an exploded perspective view of the basket-like container, stub shaft assembly.
Figure 5:
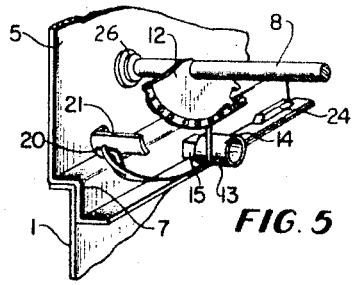
FIGURE 5 is an enlarged fragmentary view in perspective of loading or entrance station of the apparatus.

The cover 5 has an opening at each end to permit the entrance and exit of basket-like containers and is provided with an offset flange 7 at each lower edge running lengthwise. The upper portion of the flange serves as a seal for the sides of the cover and the pan while the lower portion of the offset flange serves as a track and guide for basket-like containers which will later be described in detail. The cover 5 serves also to support additional elements of an endless path conveying system which consist of shafts 8 and 9 which are rotatable in bearing mounts such as 26 seen in FIGURE 5; each shaft is fitted with a pair of sprockets 12 which may be of identical size and are rigidly fastened to the shafts. Shaft 9 extends outside of cover 5 and may be fitted with an interchangeable type sprocket 10 which would permit an assortment of conveyor travel speeds through the use of asserted diameters of sprocket plates. An electric motor 11 is attached to the outside of cover 5 and is suitably sprocketed and belted to sprocket 10. Spring loaded idlers 22 are mounted to further define the path of link chain belts 25 and to provide correct tension therefor. Mounted on chain belts 25 at mutually spaced intervals are tines 13 which are of an appropriate length, and are arranged to clear track guides, stops 21 and yieldable detents 20 while being arranged to engage the circular portion 14 of stub shafts which are best illustrated in FIGURE 3. Basket-like containers 18 as best shown in FIGURE 3 consist of two halves each made of wire mesh 17, an end portion which might also be made of open construction and which end portion has reduced diameter extremities 16 which snugly fit into the circular portion 14 of the stub shaft when the two halves are closed together. It will be seen that when uncooked product is placed in the halves and they are closed and the stub shafts affixed over members 16, a unitary rotatable structure is obtained which is placed on entrance track 19. The force of gravity will cause the basket-like container 18 to press against stop 21 and yieldable detent 20, when a pair of tines brings additional force to bear against the pair of stub shafts which they engage, basket-like container 18 will be moved past the yieldable detents 20 and through the cooker in a controlled manner. When circular portion 14 of the stub shaft bears upon a track member, onward movement of the tine 13 causes a rotative movement in the onward direction, and the number of rotations in a given distance will be proportional inversely to the dimensional diameter of circular portion 14 of the stub shaft. Rotation may be stopped and started as desired by placing suitably dimensioned camming strips along the length of track, and positioned that they will engage the squared portion 15 of the stub shaft. It will be seen in FIGURE 6 that the heighth of the camming strip is such that there is always a small clearance between round portion 14 of the stub shaft and the track; therefore squared portion 15 will always align with the upper surface of the camming strip with which it comes in contact, rather than moving onward in a canted position.

Upon passing by the location of spring loaded idlers 22, it will be seen that the basket-like containers begin ascending until they are gravitally deposited on the rails of track 23, which may be any conventional track that will carry away the basket-like containers to any desired location by gravity or otherwise.

Summarizing the invention and its operation; in its preferred embodiment and size, three whole chickens, properly cleaned, seasoned and floured are placed in each basket-like container; the stub shafts are affixed in obvious manner to hold the basket-like container together, and they are sequentially placed on inclined track 19. Each basket-like container is, in turn, thrust into the cooker and past yieldable detents 20, by mutually spaced pairs of tines 13 attached to link chain belt 25 which travels in an endless path.

The pattern of travel of each basket-like container is identical, and depends upon the oil level in the pan for depth of immersion, on the diameter of round portion 14 of the stub shaft for number of rotations in a given length, and the geometric configuration of the cross section of end portion 15 and the number, length, and location of camming strips 24 for periods when no rotation occurs.

With proper regulation of the heating temperatures, rate of travel, and level of the cooking oil, the cooking cycle of ten minutes gives optimum results. The cooked product is substantially oil or grease free by the time deposit is made on the exit track 23, however there would be no great difficulty in providing apparatus to give each basket-like container a brief "spin" in sequence.

If the surface of rounded portion 14 of the stub shaft and of the track members is unusually smooth, unwanted slippage may occur during periods when rotation is desired. One of both of these surfaces may be scored, knurled, crimped, or otherwise made to present surfaces with a higher coefficient of friction. Using a two foot by five foot size pan, under optimum conditions, nearly 200 chickens per hour can be cooked at a sustained rate of production.

Having described my invention, I claim:

1. An apparatus for frying fowl or game which comprises:

a shallow pan adapted to contain a cooking oil;

means to heat said pan;

skeletal support means to engagingly support fowl or game in said pan and to permit said fowl or game to be partially immersed in the cooking oil contained in said shallow pan;

automatic means to sequentially admit at least one of said skeletal support means into said pan, to rotate said skeletal support means in its partially immersed condition in said pan, and thereafter remove sequentially said skeletal support means from said shallow pan.

2. The apparatus of claim 1 including means to program the rotation of said skeletal support means so that rotation is stopped for predetermined periods of time while said skeletal support means is partially immersed in the cooking oil.

References Cited

UNITED STATES PATENTS

| | | | |
|---|---|---|---|
| 2,807,203 | 9/1957 | Buechele et al. | 99—404 |
| 2,907,268 | 10/1959 | Doolin | 99—404 XR |
| 2,917,008 | 12/1959 | Kipnis. | |
| 2,938,450 | 5/1960 | Carpenter et al. | 99—427 |
| 3,336,859 | 8/1967 | Barker et al. | |
| 3,372,636 | 3/1968 | Marasco | 99—443 XR |

WILLIAM I. PRICE, Primary Examiner

A. O. HENDERSON, Assistant Examiner

U.S. Cl. X.R.

99—443